R. C. RATHBORNE.
FOLDING ANIMAL BENCH.
APPLICATION FILED AUG. 28, 1907.
902,508.
Patented Oct. 27, 1908.
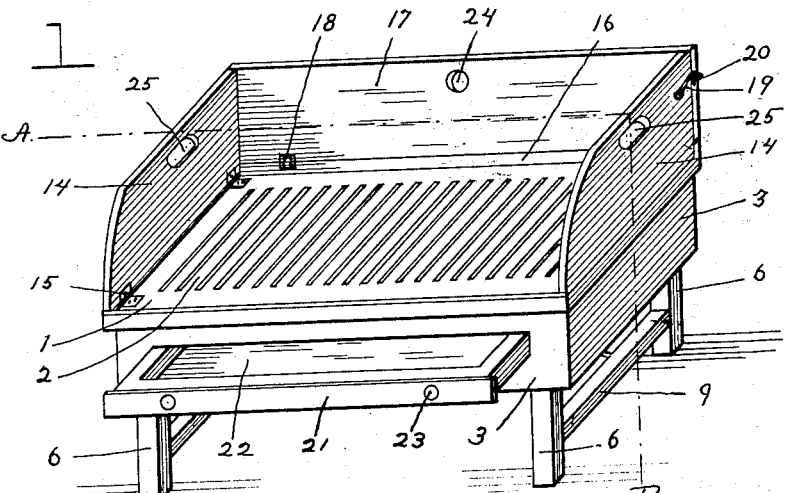
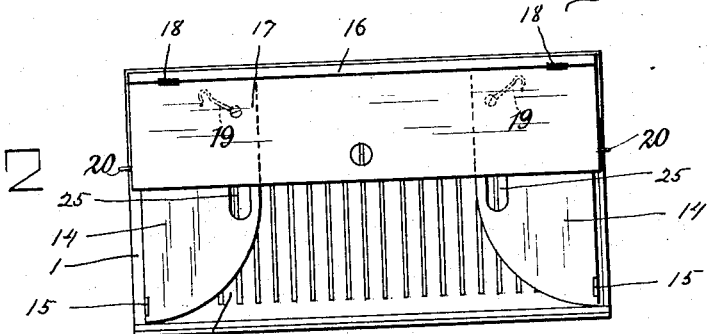
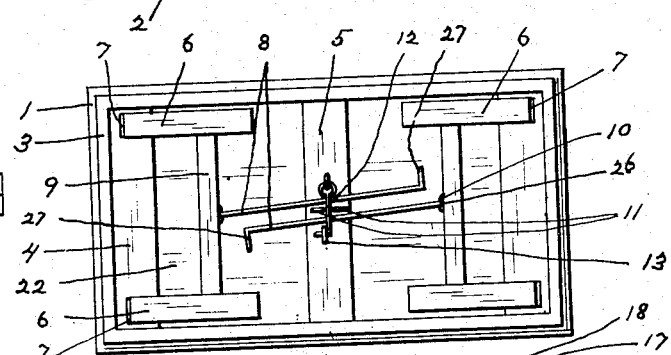
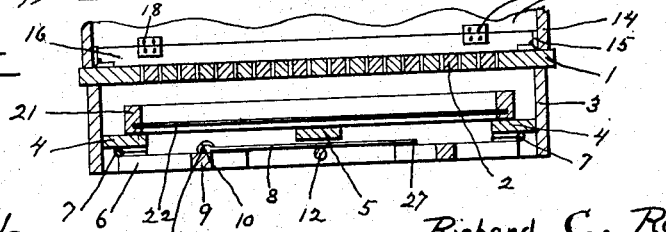
WITNESSES:
H. J. Salt
F. V. V. Thompson
INVENTOR
Richard C. Rathborne.
BY
John J. Thompson
ATTORNEY

UNITED STATES PATENT OFFICE.

RICHARD CHARLES RATHBORNE, OF NEWARK, NEW JERSEY, ASSIGNOR TO SPRATT'S PATENT (AMERICA) LIMITED, OF NEWARK, NEW JERSEY, A CORPORATION OF GREAT BRITAIN.

FOLDING ANIMAL-BENCH.

No. 902,508.   Specification of Letters Patent.   Patented Oct. 27, 1908.

Application filed August 28, 1907. Serial No. 390,436.

*To all whom it may concern:*

Be it known that I, RICHARD CHARLES RATHBORNE, a subject of Great Britain, residing at 14 Congress street, in the city of Newark, in the county of Essex and State of New Jersey, have invented certain new and useful Improvements in Folding Animal-Benches, of which the following is a specification, reference being had therein to the accompanying drawing.

My invention relates to a folding animal bench or lounge, for small animals, such as dogs, and cats, and is designed to provide a simple, strong and sanitary folding bench that may be easily transported from place to place: that occupies a small space when not in use, and securely provides against the filth from the animal reaching the floor.

My device is provided with a top composed of slats or rods, which are placed so close together as to have all the advantages of an unbroken top or floor, while at the same time the spaces formed between the slats allow all dirt, water, etc. from the animal to freely pass between and into a drawer or tray which is slidably contained within the frame-work of said bench, directly under said slats, and which may be removed for the purpose of cleaning. For the purpose of supporting said bench, I provide legs, hinged to the underside of braces forming part of the frame-work of said bench: said legs being adapted to be folded when not in use, within said frame. I also provide folding sides and back hinged to the upper side of the bench top, which provide a shield for the animal and when not in use may be folded down upon the bench-top, thus making a very compact device.

While I have illustrated my device with back and sides of solid material, I do not confine myself to this construction, as they may be made of grille-work.

In the drawings:—Figure 1 shows the bench set up. Fig. 2 is a plan view of the bench folded. Fig. 3 shows the bottom with the legs folded. Fig. 4 is a sectional view on the line A—B of Fig. 1, showing the manner of securing the legs when folded.

1, indicates a rectangular top integral with perforation therein, thus forming a grille or screen, and to the bottom of which is attached the supporting frame 3, which is strengthened by the braces 4, and 5. To the braces 4, are hinged the legs 6, by the hinges 7, in such a manner that when the legs 6, are extended they are held in a rigid manner by the hooked stay-rods 8, which are secured to the leg braces 9, by a ring 26, formed in one end of said stay-rod 8, linked to an eye 10, secured to the leg brace 9; while the other end of the stay-rod 8, is formed with a hook 27, which is engaged by the eye 11, which is secured to the brace 5. When the legs 6, are closed or folded, the stay-rods 8, may be secured in the manner shown in Fig. 3, by the hook 12, and the eye 13, both of which are secured to the brace 5, as shown, and which are adapted to hook over the stay-rods 8, thus retaining them between said hook 12, and the under side of the brace 5.

To the top of the bench and near its ends or shorter sides are secured the folding sides 14, by the hinges 15, while at its back or longer side is secured the strip 16, to which is hinged the folding back 17, by the hinges 18, in such a manner that after the sides 14, are folded down upon the bench top, the back 17, may be folded down upon them; the strip 16, compensating for the thickness of the sides 14.

The sides 14, and the back 17, are held when open in a rigid manner by the hooks 19, which are placed on the outside and near the rear end of the sides 14, (or the corner formed by the side 14, and back 17,) said hook 19, engaging a pin or eye 20, which is secured to the ends of the back 17. Sliding upon the braces 4, and 5, and guided by a rectangular opening in the front of the frame 3, is placed the tray or drawer 21, which is formed with a metallic or other waterproof bottom 22, adapted to catch and retain the droppings which pass between the slats 2: said drawer being readily removed by the knobs 23, for the purpose of cleaning. In the folding back 17, near its center and top, I provide the hole 24, to which may be secured the tie of the animal: while in the sides 14, near their top, I provide the handholes 25, by which the bench may be lifted.

The device is so simple and its mode of use so obvious that further details as to its operation are not needed.

Having thus described my invention, what I claim as new and desire to secure by Letters Patent is:

1. In a device of the class described, a bench formed with a perforated top; folding sides and back, hinged to said top; a frame supporting said top; a tray slidably mounted within said frame; braces forming part of said frame; legs hinged to said frame-braces; leg braces secured to said legs; and hooked stay-rods secured to the leg-braces.

2. A bench of the class described, having an integral, rectangular perforated top, upright sides and back hinged to the upper surface of said bench-top, a rectangular frame secured to the under surface of and supporting said bench-top; transverse end braces secured to said frame, a tray slidably mounted within said frame and resting upon said braces, legs hinged to said braces, a center brace secured to said frame, a center brace connecting each pair of legs and hooked stay-rods secured thereto.

3. A bench of the class described, having a rectangular top, integral with perforation therein: sides hinged at their lower edges to the upper surface of said bench-top, at right angles to said surface when open, and adapted to fold inwardly upon said top when closed.

4. A bench of the class described having a perforated top, folding sides: a strip secured to the upper surface of said bench-top near its rear edge: a back hinged at its lower edge to the upper surface of said strip: said back standing at right angles to said bench-top when open, and being adapted to fold inwardly upon the folded sides of said bench.

5. A bench of the class described, having a perforated top, folding sides and back: hooks secured to the outer sides of said folding sides near their rear edges: eyes secured to the ends of the folding back near its top, adapted to be engaged by said hooks.

6. A bench of the class described, having a perforated top, folding sides and back, a rectangular frame supporting said top braces secured to said frame: legs hinged to the under surface of said braces near their ends, and adapted to fold within said frame: leg braces secured at right angles to said legs midway their ends, retaining said legs in pairs: stay-rods formed at one end with hooks and at the other end with eyes secured to said leg braces: a center brace secured to said supporting frame eyes secured to the under surface of the center brace of said frame, adapted to be engaged by said hooks.

7. A bench of the class described, having a perforated top, folding sides and back secured to said top, a rectangular frame formed with an opening in its front and supporting said top, transverse braces secured to said frame, legs hinged to said braces, stay-rods hingeably secured at one end to said legs and at the other end detachably to one of said frame braces, a rectangular tray slidably mounted within said frame, supported by said braces.

In testimony whereof I have affixed my signature in presence of two witnesses.

RICHARD CHARLES RATHBORNE.

Witnesses:
WM. L. MORGAN,
EDGAR A. BROSS.